July 23, 1935.  H. S. EBERHARD  2,008,901
SEAL
Filed Dec. 26, 1931
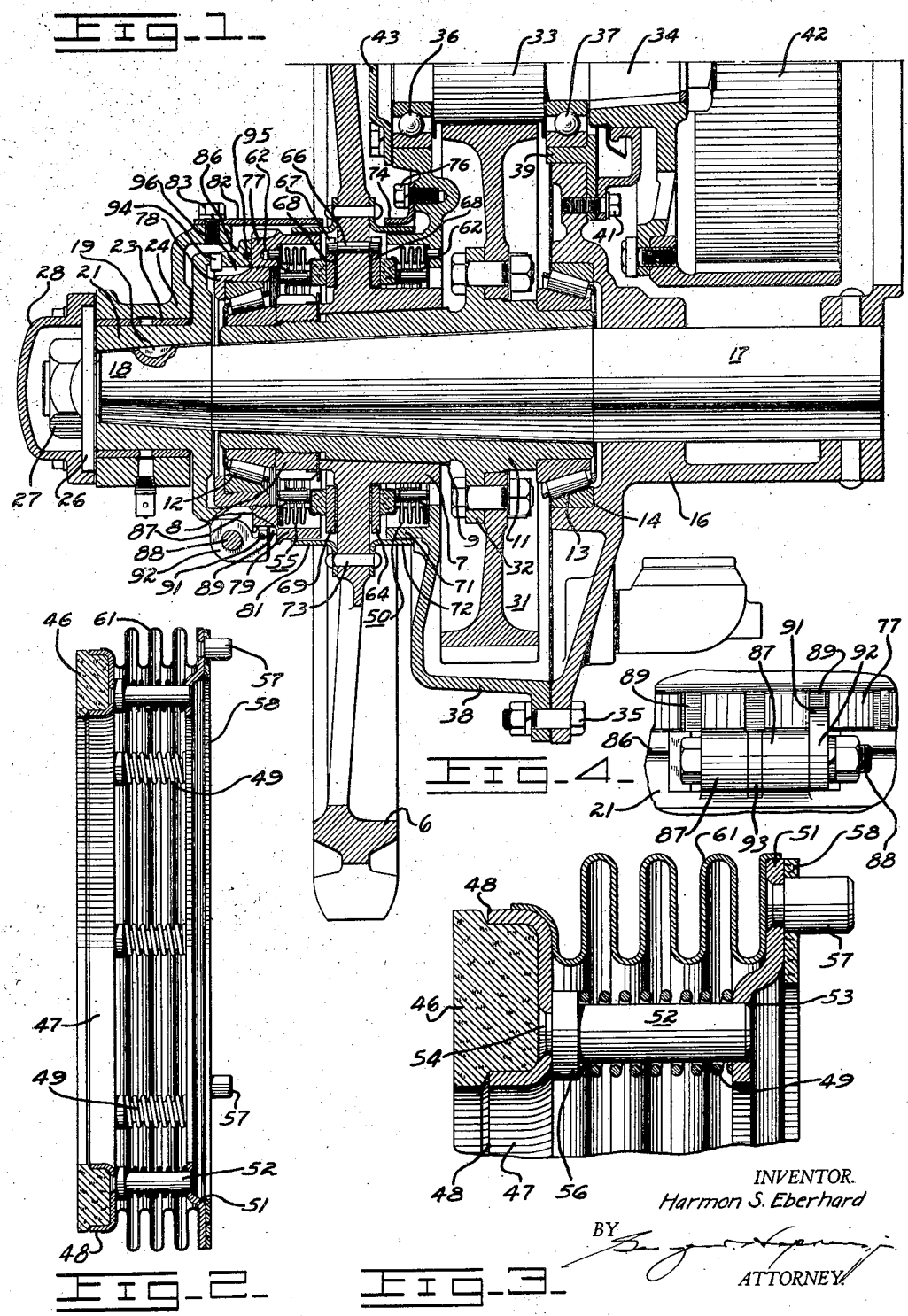
INVENTOR.
Harmon S. Eberhard
BY
ATTORNEY Patented July 23, 1935

2,008,901

UNITED STATES PATENT OFFICE 2,008,901

SEAL

Harmon S. Eberhard, San Leandro, Calif., assignor to Caterpillar Tractor Co., San Leandro, Calif., a corporation of California Application December 26, 1931, Serial No. 583,170

23 Claims. (Cl. 74—390)

This invention is concerned with the protection of bearings for a rotatable element and the driving mechanism for that element. When power is delivered to the exterior of a machine it is necessary, where the machine is operating in the presence of dirt, gravel, and other abrasives, that the mechanism of the machine be protected against the entrance of such abrasives. Thus, where power is delivered through a sprocket wheel to a track in a track laying type tractor, the driving mechanism for the sprocket wheel, and the associated bearings, are desirably enclosed and sealed against atmospheric communication to prevent entrance of dirt and like deleterious materials.

It is in general the object of the present invention to provide a seal for a rotating element such as a sprocket wheel on a tractor. The invention has been successfully used in sealing the sprocket wheel on a tractor and I shall preferably describe it in this connection although it is not limited in use to only this application.

A further object of the invention is to devise a relatively simple and yet extremely effective seal.

The invention possesses other objects and features of advantage which will appear in the following specification.

Description of drawing

In the drawing accompanying and forming a part of this specification, Fig. 1 is a section taken through the sprocket wheel and its associated driving, supporting and sealing mechanisms.

Fig. 2 is a section taken through a portion of the seal unit.

Fig. 3 is an enlarged fragmentary section of a portion of the seal.

Fig. 4 is a view illustrating how portions of the sprocket wheel are sealed and locked in position.

Description of mechanism

In the accompanying drawing, I have shown the supporting mechanism and driving mechanism as including sprocket wheel 6 which is adapted upon rotation to engage the track of a track laying type tractor. This sprocket wheel includes (Fig. 1) hub 7 secured by a lock nut 8 upon splined portion 9 of a quill 11. Quill 11 is supported at either end for rotation in roller bearings 12 and 13 respectively provided on the outboard and inboard side of sprocket wheel 6.

Roller bearing 13 is pressed into recess 14 formed in housing 16. Stub axle 17 is also supported by housing 16 and extends therefrom through quill 11 without contacting quill 11. Outboard end 18 of stub axle 17 is secured by key 19 to member 21 which serves to support roller bearing 12 in a manner to be described. Bearing 23 on member 21 is carried in member 24 which is adapted to be secured to a truck frame (not shown). Member 21 is kept in place on axle 17 by washer 26 and nut 27 which are enclosed by a cap 28. Axle 17 and member 21 are stationary and member 24 and the truck frame rotate about the axis of axle 17.

For driving sprocket wheel 6, gear 31 is bolted to flange 32 formed upon quill 11. Gear 31 is in turn driven by gear 33 which is carried upon shaft 34 which derives power from a clutch element 42 which is secured to shaft 34. Shaft 34 is supported for rotaton in ball bearings 36 and 37 respectively positioned on the outboard and inboard side of gear 31. Ball bearing 37 is supported by member 39 and is retained in position by the flange on member 39. Ball bearing 36 fits in an aperture in cover 38 and is retained by cap 43. Upon power being delivered to gear 31, sprocket wheel 6 is rotated, quill 11 revolving in roller bearings 12 and 13 about shaft 17.

To protect the various bearings and driving mechanism for the sprocket, I provide unitary seal structures 50 and 55 (Figs. 2 and 3). In units 50 and 55, which are identical, I include sealing member 46 adapted to withstand successfully and to preserve a sealing contact upon relative rotation with respect to an adjacent surface with which it effectively forms a seal. A suitable material for sealing member 46 is oil impregnated cork. I provide backing member 47 for member 46. Since seal member 46 is annular in shape, backing member 47 is of a like configuration and is formed so that it is capable of retaining the sealing material as by crimping over edges 48 of backing member 47.

To preserve sealing member 46 in sealing contact with the surface with which it is to be in sealing engagement, I include springs 49 which are effective to force the sealing member into sealing contact. Springs 49 are included between member 47 and annular cupped ring 51. Springs 49 are carried by pins 52 which extend through apertures 53 in annular ring 51, pins 52 being riveted as at 54 to backing member 47. Pins 52 transmit torsional stress from member 47 to ring 51 and also act as guides for springs 49, which are positioned between shoulders 56 formed upon each pin 52 and annular ring 51.

It is to be noted that pins 52 are directly in back of sealing member 46 and that spring pressure is directly placed on backing member 47 adjacent sealing member 46. The structure formed is a separate unitary structure (Fig. 2) which can be manufactured and handled as such.

To position this unitary structure and to retain the structure against relative rotation upon a support, I extend a set of guide pins 57 from ring 51 to engage apertures 62 in the supporting members as cover 38 and nut 77. Gasket 58 is placed between ring 51 and its support, as cover 38 and nut 77, so that an effective seal is maintained at the juncture because springs 49 press ring 51.

To join backing member 47 and ring 51, I solder shroud member 61 to backing member 47 and ring 51. Shroud member 61 is a flexible metallic bellows and its spring action aids in maintaining sealing contact of sealing member 46 and, at the same time, effectively seals between backing member 47 and ring 51. A simple seal structure is thus formed which is a unit, as appears in Fig. 2, and which can be handled as a unit during assembly, repair, and inspection. Further, the seal occupies a minimum of space while permitting installation of a maximum of other mechanism.

While the unitary sealing structure shown in Fig. 2 can be mounted upon a rotating member, I prefer to secure the structure on a fixed support and allow sealing member 46 to engage and seal against the surface of the rotating member. In the assembly shown in Fig. 1, I include unitary sealing structure 50 on inboard side of sprocket wheel 6 and unitary sealing structure 55 on outboard side of sprocket wheel 6. I secure sealing structure 50 by inserting pins 57 through apertures 62 formed in cover 38. Sealing member 46 engages and wipes against washer 64. Washers 64 and 69 are positioned by pins 66, passed through sprocket wheel 6, engaging notches 67 in washers 64 and 69. Gaskets 68 are placed between washers 64 and 69 and sprocket wheel 6. Upon rotation of sprocket wheel 6, washer 64 is rotated while sealing member 46 is maintained stationary and is forced into a positive sealing contact against washer 64.

A seal is provided upon the outboard side of sprocket wheel 6, sealing structure 55 being carried upon nut 77 by inserting pins 57 in apertures 62 in nut 77. Nut 77 is held in position upon member 78 which retains roller bearing 12 in place. Seal unit 55 engages washer 69.

Roller bearing 12 is positioned between quill 11 and threaded member 78 which slides into and is partially surrounded by flanged extension 86 of member 21. Flanged extension 86 (Figs. 1 and 4) is milled out between ears 87 enabling flanged extension 86 to be tightened about member 78 by bolt 88 passed through ears 87. Nut 77 is screwed onto threaded member 78 and enables roller bearings 12 and 13 to be adjusted. Nut 77 includes serrations 89, one of which is engaged by finger 91 on lock 92. Bolt 88 retains (Figs. 1 and 4) lock 92 in locking position. Bolt 88 also retains block 93 in place to seal the slot between ears 87. Block 93 is of oil resisting rubber and prevents dust entrance.

The structure is assembled as follows: After shaft 34 is in place, the cup of roller bearing 13 is pressed into place in housing 16. Stub axle 17 is then positioned. Gear 31 is bolted onto flange 32 on quill 11 and the cone and roller assembly of roller bearing 13 fitted onto quill 11. Quill 11 and gear 31 are slid along stub axle 17 until gear 31 meshes with gear 33 and roller bearing 13 fits together loosely. Cover 38 is then secured by bolts 35 on housing 16. Ball bearing 36 is positioned in cover 38 on shaft 34. Cap 43 is bolted onto cover 38 to secure ball bearing 36. Seal structure 50 is placed on cover 38 and wheel 6 is slid onto spline portion 9 of quill 11, washers 64 and 69 having been previously positioned on wheel 6 by pins 66. Nut 8 is then screwed onto quill 11 to retain wheel 6 thereon. The cone and roller assembly of roller bearing 12 is then fitted onto quill 11, the cup of roller bearing 12 being pressed in member 78 upon which nut 77 carrying seal structure 55 has been threaded. Threaded member 78 and the remaining portion of roller bearing 12 is slid into place, nut 77 carrying seal structure 55 into place. Member 21 is positioned on outboard end 18 of stub axle 17, key 19 engaging member 21 and axle 17. Member 24 is placed on member 21. Member 21 is drawn into engagement with tapered end 18 of axle 17 by washer 26 and nut 27. Cap 28 is positioned over nut 27. By turning nut 77, which bears against flanged extension 86, member 78 is drawn inwardly to seat properly the rollers in their cups. Pin 94 engages slot 96 in member 78 to retain member 78 against rotation. Packing ring 95 is positioned between flanged extension 86 and nut 77. After nut 77 has been moved to adjust bearings 12 and 13, bolt 88 is drawn up to retain finger 91 on lock 92 in position in one of serrations 89 and to clamp flanged extension 86 about threaded member 78. Subsequent adjustment of bearings 12 and 13 can be effected by loosening bolt 88 to release lock 92 and turning nut 77.

This assembly is facilitated by the fact that seal structures 50 and 55 can be handled as units and a multitude of small springs, packing rings and other seal elements do not have to be separately aligned, kept in alignment and held together by hand.

To protect sealing structure 50 against direct contact with any large particles as rocks or clods of dirt, I form cover 38 with annular extending flange portion 71 which surrounds almost entirely sealing structure 50. The effectiveness of the protection afforded by this flange is enhanced by annular shroud 72, secured to the sprocket wheel 6 by rivets 73. Shroud 72 surrounds and extends over annular flange 71. A second shroud 74 is secured by studs 76 to cover 38 so as to enclose partially the upper portion of annular shroud 72 and thus provide a very effective seal against the entrance of any particles which may drop down upon the upper portion of the assembly.

A protecting structure is provided for sealing structure 55. Thus nut 77 includes flange portion 79 which extends over sealing structure 55 and, together with shroud member 81, secured by rivets 73 to sprocket wheel 6, serves to prevent direct contact of larger particles of abrasive materials with sealing structure 55. An outer shroud member 82 is also provided, this shroud member being mounted upon member 24 by studs 83 to shield and ward off entrance into sealing structure 55.

I, therefore, claim as my invention:

1. A unitary seal structure for positioning as a seal between a stationary member and a member movable with respect thereto comprising a sealing member, means for backing said sealing member, an expansible element, and a plurality of pins extending from immediately behind said sealing member and connected to said stationary member to hold said seal structure against rotation.

2. A unitary seal structure for positioning as a seal between a stationary member and a member movable with respect thereto comprising a sealing member, an expansible element, a second sealing member, backing means for said second sealing member, said element being engaged with both said backing means and said first-mentioned sealing member, and a plurality of pins extending from immediately behind said sealing member and connected to said stationary member to hold said seal structure against rotation.

3. In a motor vehicle; driving mechanism including a pinion; a housing; a shaft in said housing and extending therefrom; a bearing cup in said housing; a unit including a sleeve about said shaft, a gear, and bearing rollers and cone, said unit being adapted to be slid on axially of said shaft to seat said bearing rollers in said cup and to engage said pinion and said gear; a cover adapted to be bolted onto said housing over said sleeve and said shaft; a seal adapted to be received in said cover and slid on axially of said shaft; a sprocket adapted to be slid onto said sleeve axially of said shaft for driving connection therewith; a washer on one side of said sprocket to engage operatively said seal when said sprocket is placed on said sleeve; a nut to secure said sprocket on said sleeve; another washer on another side of said sprocket; a seal adapted to engage said another washer; a bearing roller and cone on said sleeve; an annular threaded member adapted to be slid on said shaft; a bearing cup in said threaded member; a second nut adapted to screw onto said threaded member and retain said seal in engagement with said another washer; and a member adapted to be fixed on the end of said shaft to engage said nut screwed onto said threaded member whereby said bearing rollers can be adjusted in said cones and said cups.

4. In a motor vehicle; driving mechanism including a pinion; a housing; a shaft in said housing and extending therefrom; a bearing cup in said housing; a unit including a sleeve about said shaft, a gear, and bearing rollers and cone, said unit being adapted to be slid on axially of said shaft to seat said bearing rollers in said cup and to engage said pinion and said gear; a cover adapted to be bolted onto said housing over said sleeve and said shaft; a seal adapted to be received in said cover and slid on axially of said shaft; a sprocket adapted to be slid onto said sleeve axially of said shaft for driving connection therewith; a washer on one side of said sprocket to engage operatively said seal when said sprocket is placed on said sleeve; a nut to secure said sprocket on said sleeve; another washer on another side of said sprocket; a seal adapted to engage said another washer; a bearing roller and cone on said sleeve; an annular threaded member adapted to be slid on said shaft; a bearing cup in said threaded member; a second nut adapted to screw onto said threaded member and retain said seal in engagement with said another washer, said second nut having a serrated periphery; a member adapted to be slid onto the end of said shaft to engage said nut screwed onto said threaded member, said member being adapted to be engaged with said threaded member to retain said threaded member in a desired position; and means to engage a serration on said second nut.

5. In a motor vehicle, a support, a shaft having an end extending from said support, a wheel hub adapted to be slid along said shaft, a roller bearing between an end of said hub and said support, a member adapted to be fixed on the end of said shaft, a threaded member mounted in said member, a roller bearing between said hub and said threaded member, and another member adapted to be screwed onto said threaded member and to bear against said member to adjust said bearings.

6. In a motor vehicle, a support, a shaft having an end extending from said support, a wheel hub adapted to be slid along said shaft, a roller bearing between an end of said hub and said support, a member adapted to be fixed on the end of said shaft, a threaded member mounted in said member, a roller bearing between said hub and said threaded member, another member adapted to be screwed onto said threaded member and to bear against said member to adjust said bearings, said another member including a serrated portion, and means on said member to engage said serrated portion to retain said another member in an adjusted position.

7. In a motor vehicle, a support, a shaft having an end extending from said support, a wheel hub adapted to be slid along said shaft, a roller bearing between an end of said hub and said support, a member adapted to be fixed on the end of said shaft, a threaded member mounted in said member, a roller bearing between said hub and said threaded member, another member adapted to be screwed onto said threaded member and to bear against said member to adjust said bearings, and means to clamp said member about said threaded member.

8. In a device of the class described, driving mechanism including a hub and a wheel, a shaft, journal means for supporting the wheel and the hub for rotation about the shaft, sealing means, and means including a member housing said sealing means serving both to position said sealing means and to position said hub, wheel and journal means.

9. In a device of the class described, a unitary positionable sealing structure comprising a sealing member, means for backing said sealing member, a second member spaced from said backing means, a plurality of pins connected to said backing means and to said second member, said pins being positioned in line with said sealing member, resilient means about said pins thrusting apart the backing means and said second member, and a plurality of pins for supporting a sealing member on said second member.

10. In a device of the class described, a unitary positionable sealing structure comprising a sealing member, means for backing said sealing member, a second member spaced from said backing means, a plurality of pins connected to said backing means and to said second member, said pins being positioned in line with said sealing member, resilient means about said pins thrusting apart the backing means and said second member, and a plurality of pins for supporting a sealing member on said second member, said pins providing means to hold the sealing structure in position.

11. In a device of the class described, a main housing, a wheel mounted for rotation without the housing, driving and supporting mechanism for said wheel, the driving mechanism being chiefly within the housing, and sealing means for said mechanism, comprising a sealing structure at each side of wheel and in frictional sealing engagement therewith.

12. In a device of the class described, a shaft, driving mechanism about said shaft and including a movable surface normal to the axis of said shaft, elements associated with said driving mechanism, spring-pressed sealing means for said mechanism and having a surface adapted to be maintained in frictional contact with said first-mentioned surface, said sealing means being adapted to be inserted in position by movement in a direction along the axis of said shaft, and means movable in a direction normal to the plane of contact of said surfaces and along the axis of said shaft serving both to position said sealing means and to position said elements, said latter means serving to house said sealing means.

13. In a device of the class described, a housing having driving mechanism therein, a shaft extending from within said housing, a driving unit including a sleeve and a gear adapted to be inserted axially along said shaft into engagement with said driving mechanism, a cover adapted to be secured to said housing and about said sleeve, a wheel adapted to be secured to said sleeve and outside of said cover, an annular resilient sealing unit adapted to be positioned axially along said shaft prior to securing of said wheel and compressed between one side of said wheel and said cover, a second annular resilient sealing unit adapted to be positioned axially along said shaft and to be positioned at the other side of said wheel, and means axially positionable along said shaft serving both to maintain the sealing units in position and to position said driving unit, said latter means cooperating with said other side of said wheel to house said second sealing unit.

14. Sealing means for positioning as a seal between a non-rotatable member and a member rotatable about an axis with respect to said non-rotatable member, comprising a sealing surface rotatable with said rotatable member, a seal structure including a second sealing surface adapted to be pressed into frictional engagement with said first mentioned sealing surface, an annular flexible member having sealing engagement at one portion thereof with said seal structure and at another portion thereof with said non-rotatable member, spring means pressing against said structure to maintain said surfaces in frictional engagement, and a plurality of pins about the axis of rotation of said rotatable member, said pins being connected to said structure at a position in line with the area of frictional engagement between said surfaces and being also connected to said non-rotatable member.

15. Sealing means for positioning as a seal between a non-rotatable member and a member rotatable about an axis with respect to said non-rotatable member, comprising a sealing surface rotatable with said rotatable member, a seal structure including a second sealing surface adapted to be pressed into frictional engagement with said first mentioned sealing surface, an annular flexible member having sealing engagement at one portion thereof with said seal structure and at another portion thereof with said non-rotatable member, a plurality of pins about the axis of rotation of said rotatable member, said pins being connected to said structure at a position in line with the area of frictional engagement between said surfaces and being also connected to said non-rotatable member, and a plurality of springs about the axis of rotation of said rotatable member and in line with said area of frictional engagement between said surfaces to maintain said surfaces in engagement.

16. A seal structure between a stationary casing having an open end and a tractor wheel rotatably mounted adjacent said open end by drive means extending through said casing, comprising an annular sealing surface rotatable with said wheel and adjacent said open end of said casing, an annular packing adapted to be maintained in frictional sealing engagement with said surface, a backing member for said packing, a plurality of non-rotatable pins connected to said backing member in line with said packing to hold said backing member against rotation, resilient means pressing said backing member to maintain said packing in frictional engagement with said surface, and additional sealing means, including an annular flexible member, said additional sealing means having sealing engagement at one portion thereof with said backing member and at another portion thereof with said casing.

17. In a vehicle, a supporting structure, a shaft extending therefrom, a driving unit including a rotatable sleeve about said shaft and a wheel secured for rotation with said sleeve, and a resiliently pressed seal structure at each side of said wheel and about said sleeve, each seal structure being located between an end of said sleeve and a side of said wheel.

18. In a vehicle, a supporting structure, a shaft extending therefrom, a driving unit including a rotatable sleeve about said shaft and a wheel secured for rotation with said sleeve, journal means between said sleeve and said supporting structure, second journal means for said sleeve and supported by said shaft, and a seal structure positioned between each of said journal means and a side of said wheel, both of said seal structures being located between said journal means.

19. In a vehicle, a supporting structure, a shaft extending therefrom, a driving unit including a rotatable sleeve freely spaced from said shaft and a wheel mounted for rotation with said sleeve, bearing means between one end portion of said sleeve and said supporting structure, a bearing housing structure secured to said shaft adjacent the opposite end portion of said sleeve, second bearing means in said bearing housing structure and in which said opposite end portion of said sleeve is journalled to be supported by said shaft, a seal structure about said opposite end portion of said sleeve and positioned between said second bearing means and a side of said wheel, and a second seal structure about said sleeve and positioned between said first mentioned bearing means and the other side of said wheel.

20. In a vehicle, a supporting structure, a shaft extending therefrom, a driving unit including a rotatable sleeve freely spaced from said shaft and a wheel mounted for rotation with said sleeve, bearing means between one end portion of said sleeve and said supporting structure, a bearing housing structure secured to said shaft adjacent the opposite end portion of said sleeve, second bearing means in said bearing housing structure and in which said opposite end portion of said sleeve is journalled to be supported by said shaft, a resilient non-rotatable seal structure about said opposite end portion of said sleeve housed within said bearing housing structure, said seal structure being compressed between said bearing housing structure and a side of said wheel, and a second resilient non-rotatable seal structure compressed between the opposite side of said wheel and said supporting structure.

21. In a vehicle, a housing enclosing driving mechanism, a shaft supported on said housing and extending to a position without said housing, a driving unit including a rotatable sleeve about said shaft and a wheel secured for rotation with said sleeve at a location without said housing, widely spaced journal means for said unit between which said wheel is positioned, one of said journal means being supported by said shaft at a location outside of said housing, and a seal structure encompassing said sleeve and located between the outer side of said wheel and both the outer end of said sleeve and the journal means outside of said housing.

22. In a vehicle, a housing enclosing driving mechanism, a shaft supported on said housing and extending to a position without said housing, a driving unit including a rotatable sleeve about said shaft and a wheel secured for rotation with said sleeve at a location without said housing, widely spaced journal means for said unit between which said wheel is positioned, one of said journal means being supported by said shaft at a location outside of said housing, a seal structure encompassing said sleeve and located between the outer side of said wheel and both the outer end of said sleeve and the journal means outside of said housing, and means including a device associated with both said seal structure and said outside journal means serving both to position said outside journal means and said seal structure.

23. In a vehicle, a housing enclosing driving mechanism, a shaft supported on said housing and extending to a position without said housing, a driving unit including a rotatable tapered sleeve about said shaft with the small end thereof positioned outside of said housing and a wheel secured for rotation with said sleeve at a location without said housing, widely spaced bearings for said unit between which said wheel is positioned, one of said bearings being supported by said shaft at a location outside of said housing and serving to journal the small end portion of said sleeve, and a seal structure encompassing the small end portion of said sleeve and located between the outer side of said wheel and both the outer end of said sleeve and the bearing outside of said housing.

HARMON S. EBERHARD.